United States Patent
Chung

(10) Patent No.: US 7,453,863 B2
(45) Date of Patent: Nov. 18, 2008

(54) CELL SEARCHING APPARATUS AND METHOD IN ASYNCHRONOUS MOBILE COMMUNICATION SYSTEM

(75) Inventor: Hee-Sok Chung, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 1291 days.

(21) Appl. No.: 10/402,942

(22) Filed: Apr. 1, 2003

(65) Prior Publication Data

US 2005/0259615 A1  Nov. 24, 2005

(30) Foreign Application Priority Data

Apr. 4, 2002  (KR)  ............ 10-2002-0018665
Apr. 4, 2002  (KR)  ............ 10-2002-0018667

(51) Int. Cl.
*H04J 3/06* (2006.01)
(52) U.S. Cl. .............. 370/350; 370/329; 370/324; 370/341; 370/441; 370/335; 370/342; 455/450; 455/452.1; 455/464; 455/502; 455/509; 375/368; 375/370
(58) Field of Classification Search .......... 370/350, 370/329, 331, 341, 342, 347, 348, 324, 335; 455/502, 509; 375/368, 370
See application file for complete search history.

(56) References Cited

U.S. PATENT DOCUMENTS

| | | | | |
|---|---|---|---|---|
| 6,044,104 A | | 3/2000 | Watanabe | 375/200 |
| 6,161,022 A * | | 12/2000 | Hwang et al. | 455/561 |
| 6,356,607 B1 * | | 3/2002 | Scott et al. | 375/354 |
| 6,445,728 B1 * | | 9/2002 | Byun | 375/142 |
| 6,480,558 B1 * | | 11/2002 | Ottosson et al. | 375/350 |
| 6,542,743 B1 * | | 4/2003 | Soliman | 455/436 |
| 6,707,805 B2 * | | 3/2004 | Ozluturk et al. | 370/335 |
| 6,920,123 B1 * | | 7/2005 | Shin et al. | 370/335 |
| 6,961,352 B2 * | | 11/2005 | Bouquier et al. | 370/503 |
| 6,980,587 B2 * | | 12/2005 | Gesret et al. | 375/150 |
| 7,023,831 B2 * | | 4/2006 | Okuyama | 370/342 |
| 7,065,064 B2 * | | 6/2006 | Chitrapu | 370/335 |
| 7,072,380 B2 * | | 7/2006 | Ozluturk et al. | 375/141 |
| 7,072,383 B2 * | | 7/2006 | Saito et al. | 375/148 |
| 7,079,569 B1 * | | 7/2006 | Hayata | 375/147 |
| 7,123,600 B2 * | | 10/2006 | Ozluturk et al. | 370/335 |
| 7,154,973 B2 * | | 12/2006 | Hanada et al. | 375/354 |
| 7,158,505 B2 * | | 1/2007 | Dick et al. | 370/350 |

FOREIGN PATENT DOCUMENTS

KR  000046190 A  7/2000

* cited by examiner

*Primary Examiner*—Marceau Milord
(74) *Attorney, Agent, or Firm*—Ked & Associates, LLP

(57) ABSTRACT

A cell searching apparatus and method in an asynchronous mobile communication system allocates an adjacent SCG to each base station according to adjacent degrees. When a mobile terminal is powered on, the mobile terminal receives PSCs and SSCs from the base stations. Multiple searching of SSCs is then performed based on each slot synchronization followed by a frame synchronization and SCG detection through the first searched SSC. If the detected SCG is not an SCG of a base station to which the mobile terminal belongs, the cell searching apparatus detects an SCG with a large size among the adjacent SCGs and detects an SC by using the greatest SCG. Frame synchronization and SCG detection are therefore quickly performed in a cell searching, resulting in a quick search searching.

25 Claims, 5 Drawing Sheets

CELL SEARCHING APPARATUS AND METHOD IN ASYNCHRONOUS MOBILE COMMUNICATION SYSTEM

BACKGROUND OF THE INVENTION

1. Field of the Invention

The present invention relates to a asynchronous mobile communication system, and more particularly to a cell searching apparatus and method in an asynchronous mobile communication system.

2. Background of the Related Art

In an asynchronous mobile communication system, a mobile terminal may use a primary synchronization channel (P-SCH) and a secondary synchronization channel (S-SCH) among downlink physical channels (DPCH) in order to search for a base station. The base station can transmit a primary synchronization code (PSC) through the primary synchronization channel and a secondary synchronization code (SSC) through the secondary synchronization channel.

Each frame generally used in the asynchronous mobile communication system has a period of 10 ms and includes 15 slots (#0-#14). The base station transmits the PSC and SSC for every slot. If each slot has 2560 chips, a sequence length of the PSC of the P-SCH is 256 chips and can be positioned at the first 256 chip period of each slot. The SSC of the S-SCH has the same value for every frame.

Thus, generally, slot synchronization can be accomplished using the PSC of the PSCH and frame synchronization can be performed using the SSC of the S-SCH based on the slot synchronization. At the same time, a value of the scrambling code group (SCG) can be determined.

Each base station is assigned one of 512 scrambling codes (SC) for use and the mobile station should first determine a scrambling code group (SCG). The 512 scrambling codes are classified into 64 scrambling code groups, each group corresponding to 8 scrambling codes. Searching the base station (e.g., the cell), signifies finally detecting which scrambling code a cell to which a mobile terminal belongs uses.

FIG. 1 shows a general asynchronous mobile communication system. This system includes a mobile terminal 11 for performing base station searching through a radio access, base stations 12A-12N for connecting the mobile terminal to a mobile communication network 14 through a radio interface, and a radio network controller (RNC) 13 for controlling the base stations 12A-12N. In the general asynchronous mobile communication system constructed as described above, the SCG is assigned to each cell randomly without any regulations.

FIG. 2 shows a general cell searching apparatus of a mobile terminal. This apparatus includes: a filter 21 for removing a noise component contained in a radio frequency (RF) signal; a slot synchronizer 22 for detecting a PSC with the most powerful reception strength among a plurality of PSCs outputted from the filter 21 and for performing a slot synchronization (SS); a frame synchronizer 23 for detecting a SSC with the most powerful reception among a plurality of SSCs outputted from the filter 21 based on the slot synchronization, performing a frame synchronization, and determining an SCG; and a scrambling code detector 24 for detecting an SC by using the determined SCG.

Operation of the general cell searching apparatus of a mobile terminal will now be described. When the mobile terminal 11 is powered on, the mobile terminal starts searching a cell (e.g., a base station), which can provide service to the mobile terminal. The terminal then receives PSCs and SSCs transmitted from the base stations 12A-12N.

The slot synchronizer 22 of the mobile terminal detects a signal (PSC) with the most powerful reception strength during the slot period, and then if the signal is detected again after the slot period, the slot synchronizer 22 performs a slot synchronization (SS) based on the reception timing of the signal. The reason for using the PSC signal with the most powerful reception strength is because the reception strength of the PSC signal transmitted from the base station where the mobile terminal belongs is the most powerful.

When slot synchronization is performed, the frame synchronizer 23 searches the SSCs outputted from filter 21 based on the slot synchronization. If an SSC with the most powerful reception strength is detected, the frame synchronizer 23 performs a frame synchronization based on the detected SSC and determines an SCG. The scrambling code detector 24 detects an SC of the base station to which the mobile terminal belongs using the SCG.

In the general asynchronous mobile communication system, the SCG is randomly assigned to each base station. Thus, even if mobile terminal 11 is aware of the SCG of base stations adjacent to a specific base station to which the mobile terminal 11 belongs, it cannot know with any certainty the SCG of the specific base station. Thus, in searching the SSCs, since frame synchronization has not yet been performed, every case of shifting as many times as the number of slots (i.e., 15 slots) pet frame can be candidates of the frame synchronization and the SCG. Therefore, the frame synchronizer 23 of the mobile terminal 11 must repeatedly perform the SSC detecting process 960 times (15*64) in the worst case, in order to obtain frame synchronization and SCG.

The general cell searching apparatus of the mobile terminal, thus, has problems in that the cell searching rate is degraded and power consumption is high due to the load for cell searching.

SUMMARY OF THE INVENTION

An object of the invention is to solve at least the above problems and/or disadvantages and to provide at least the advantages described hereinafter.

Another object of the present invention is to provide an SCG allocation method in an asynchronous mobile communication system which reduces a load for cell searching and increases a cell searching rate.

Another object of the present invention is to provide a cell searching apparatus and method in an asynchronous mobile communication system that reduce a load for cell searching and increases a cell searching rate by allocating a scrambling code group to each cell corresponding to an adjacent degree of a cell, and that perform SSC searching for detection of frame synchronization in a plural structure.

To achieve these and other objects and advantages in whole or part, the present invention provides an asynchronous mobile communication system for searching a base station including: base stations using adjacent SCG according to an adjacent degree; and a mobile terminal for detecting a SCG by using first detected slot synchronization information in searching an initial cell, detecting adjacent SCGs of the detected SCG to determine a suitable SCG and completing a base station searching by using the determined SCG.

The present invention also provides a cell searching apparatus in an asynchronous mobile communication system including: a filter for removing a noise component contained in an RF signal transmitted from base stations; a slot synchronizer for serially performing a slot synchronization by using PSCs repeatedly detected after a slot period among a plurality of PSCs outputted from the filter; a processor for controlling slot synchronization, frame synchronization and SCG detecting operation; a plurality of frame synchronizers for performing detection of SCG in multiple by using each SSC outputted from the filer, and determining a desired SCG under the control of the processor on the basis of the first detected SCG; and a scrambling code detector for detecting an SC by using the determined SCG.

The present invention also provides a cell searching apparatus in an asynchronous mobile communication system including: a filter for removing a noise component contained in an RF signal transmitted from base stations; a slot synchronizer for serially performing a slot synchronization by using PSCs repeatedly detected after a slot period among a plurality of PSCs outputted from the filter; a processor for controlling slot synchronization, frame synchronization and SCG detecting operation; a frame synchronizer for serially performing frame synchronization and SCG detecting operation by using each SSC outputted from the filer on each slot synchronization information, and determining a desired SCG under the control of the processor on the basis of the first detected SCG; and a scrambling code detector for detecting an SC by using the determined SCG.

The present invention also provides an SCG allocating method in an asynchronous mobile communication system including the steps of setting an arbitrary base station as a reference base station and allocating a reference SCG thereto; and allocating an adjacent SCG of the reference SCG to base stations adjacent to the reference base station.

The present invention also provides a cell searching method in an asynchronous mobile communication system including the steps of: serially performing slot synchronization by using each PSC received from base stations; performing in multiple frame synchronization and SCG detection by using each SSC received from base stations on the basis of each serially performed slot synchronization; checking whether a first detected SCG is a desired one; determining a suitable SCG among adjacent SCGs of the first detected SCG if the first detected SCG is not a desired one; and completing a base station searching by using the determined SCG.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
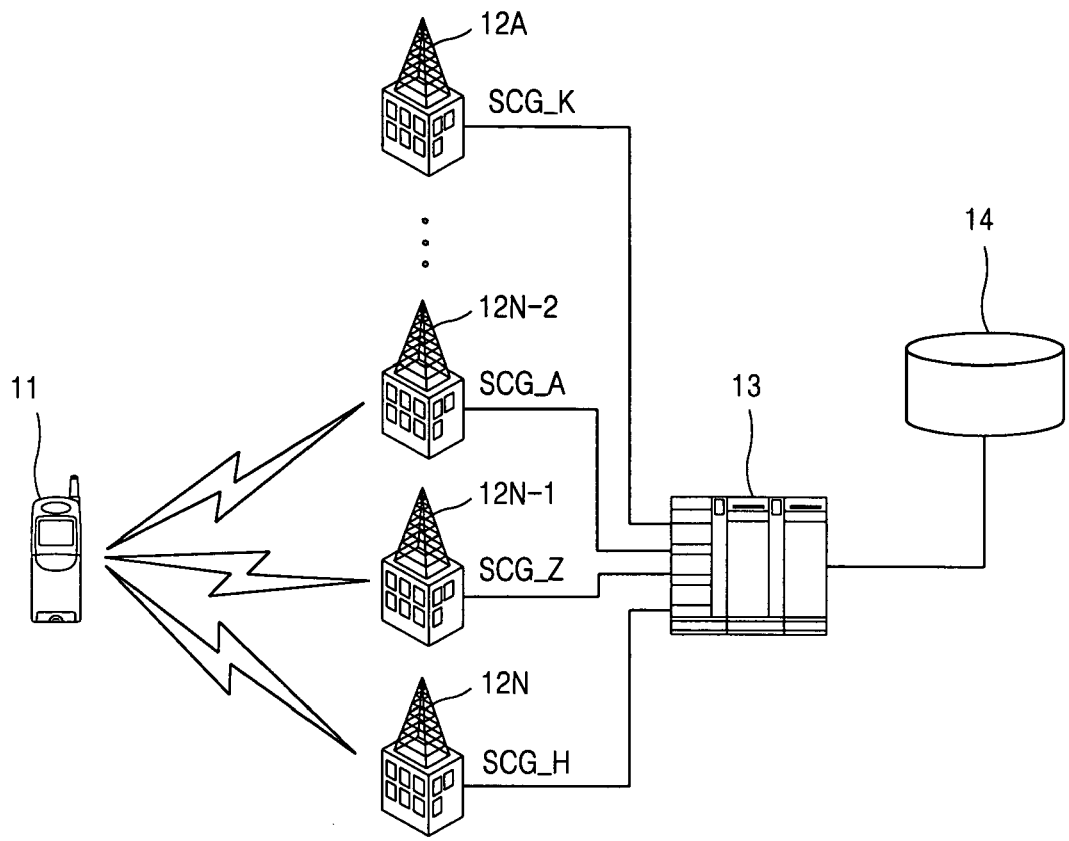
FIG. 1 illustrates the construction of a general asynchronous mobile communication system.
Figure 2:
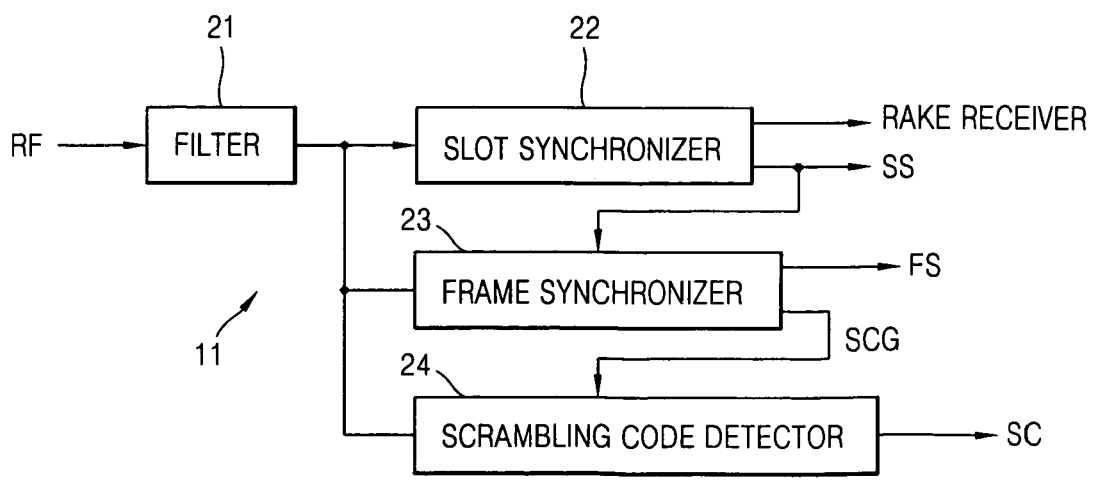
FIG. 2 illustrates the construction of a general cell searching apparatus of a mobile terminal.
Figure 3:
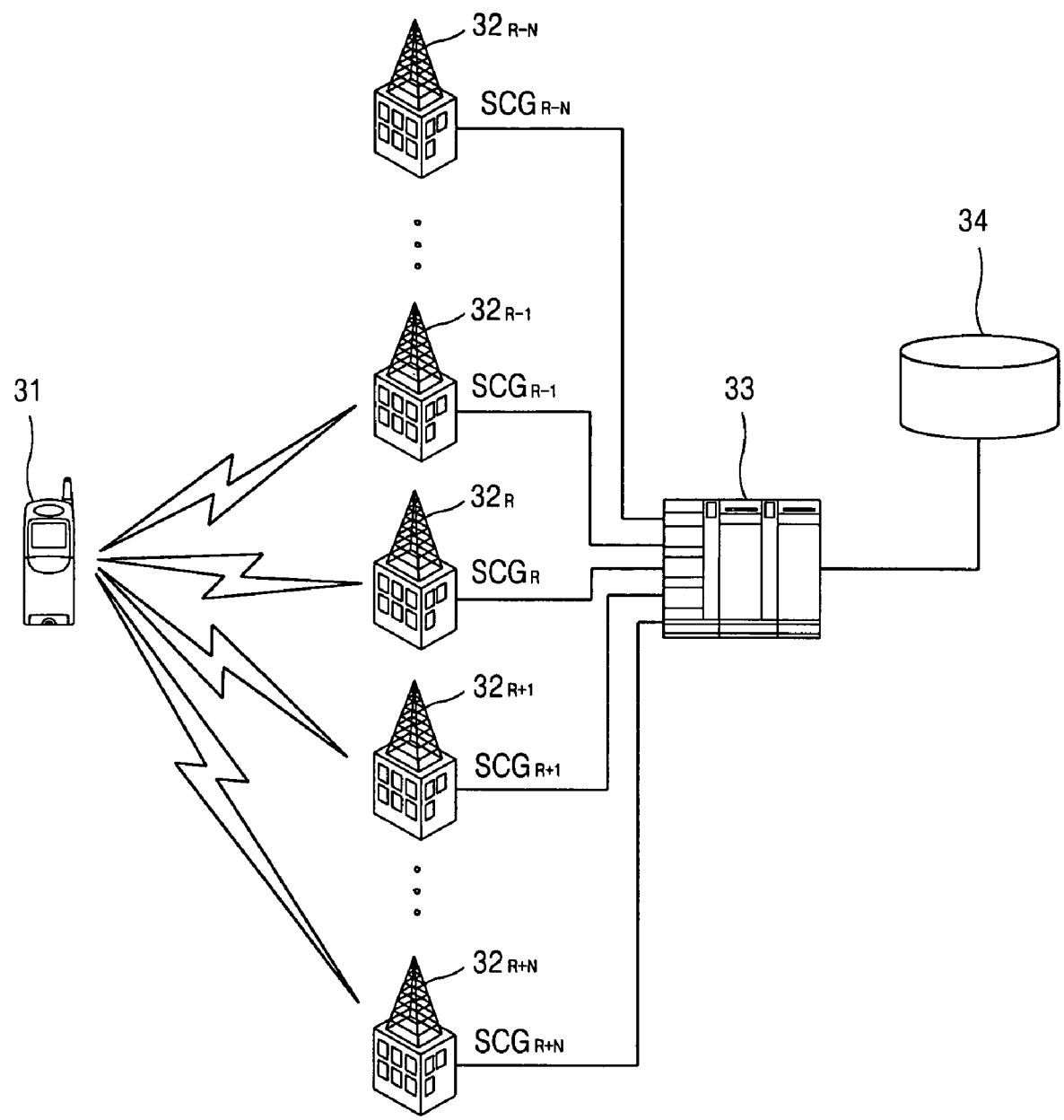
FIG. 3 illustrates how an SCG is allocated to each base station according to an SCG allocating method in accordance with the present invention.

FIG. 3 illustrates how an SCG is preferably allocated to each base station in an asynchronous mobile communication system according to an SCG allocating method in accordance with the present invention. As shown, the communication system includes a mobile terminal 31, a plurality of base stations $32_{R-N}$ ... $32_{R+N}$, a base station controller 33, and a communications network 34. In order to quickly and easily detect an SCG of a specific base station, an SCG is allocated to each base station according to a specific allocating method in accordance with the present invention. Embodiments of this method, which may at least in part be performed in mobile terminal 31, are described below.

Figure 4:
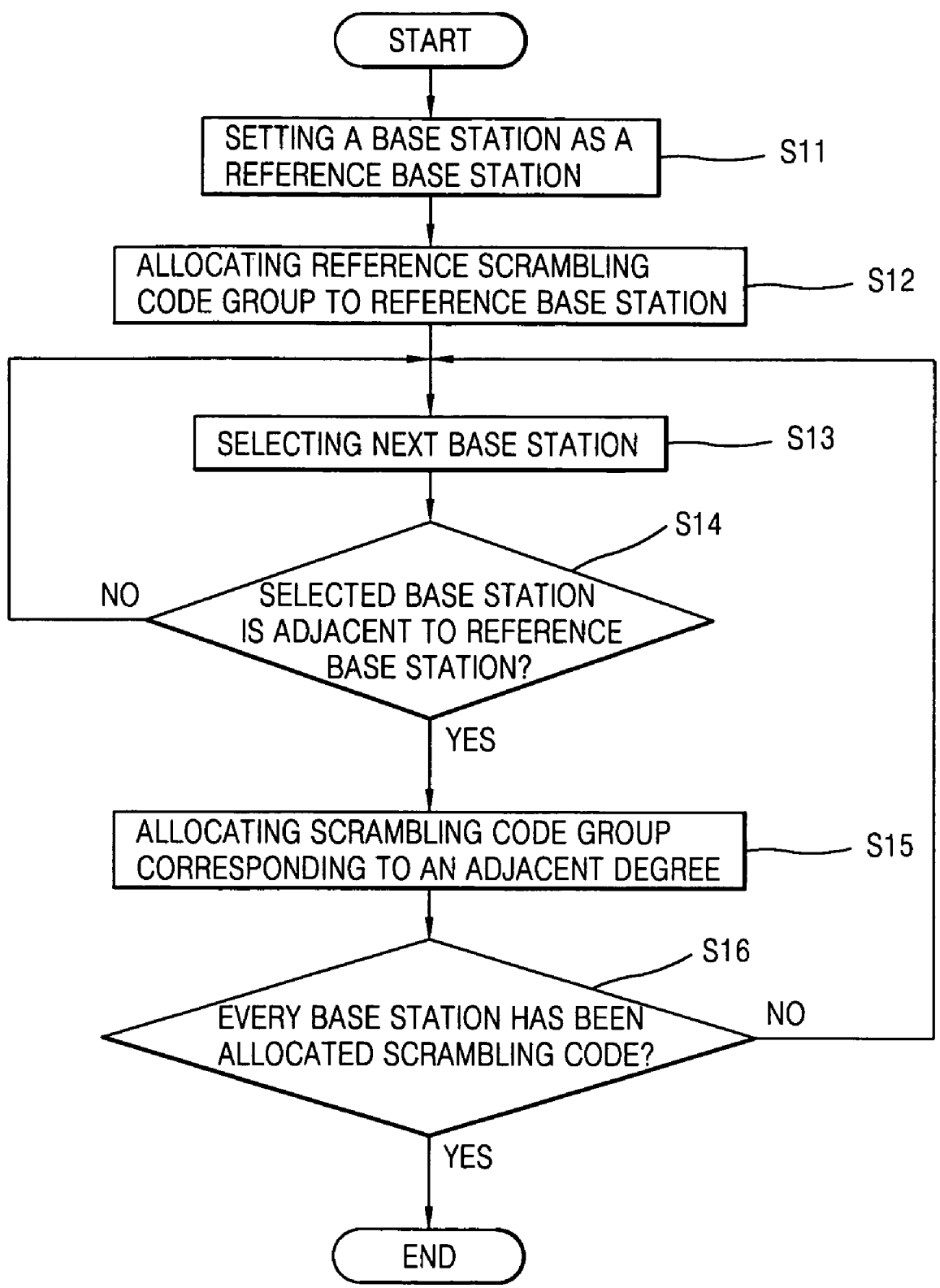
FIG. 4 is a flow chart of an SCG allocating method in an asynchronous mobile communication system in accordance with a first embodiment of the present invention.

FIG. 4 is a flow chart of an SCG allocating method in an asynchronous mobile communication system in accordance with a first embodiment of the present invention. In this method, a mobile communication provider preferably allocates an SCG to each base station according to a specific allocating method prior to operation of an asynchronous mobile communication network. That is, the mobile communication provider sets one of a plurality of base stations as a reference base station (step S11), and allocates a reference SCG to the reference base station (step S12).

The mobile communication provider then selects the next base station. If the selected base station is an adjacent one of the reference base station, the mobile communication provider allocates an adjacent SCG of the reference SCG to the selected base station (steps S13-S15). In this manner, the SCG is allocated to each base station and the adjacent base stations use the adjacent SCGs. For example, if a base station 32R is a reference base station, $SCG_{R-1} \sim SCG_{R-N}$ are respectively allocated to base stations $32_{R-1} \sim 32_{R-N}$, $SCG_{R-1} \sim SCG_{R-N}$ are respectively allocated to base stations $32_{R+1} \sim 32_{R+N}$.

Figure 5:
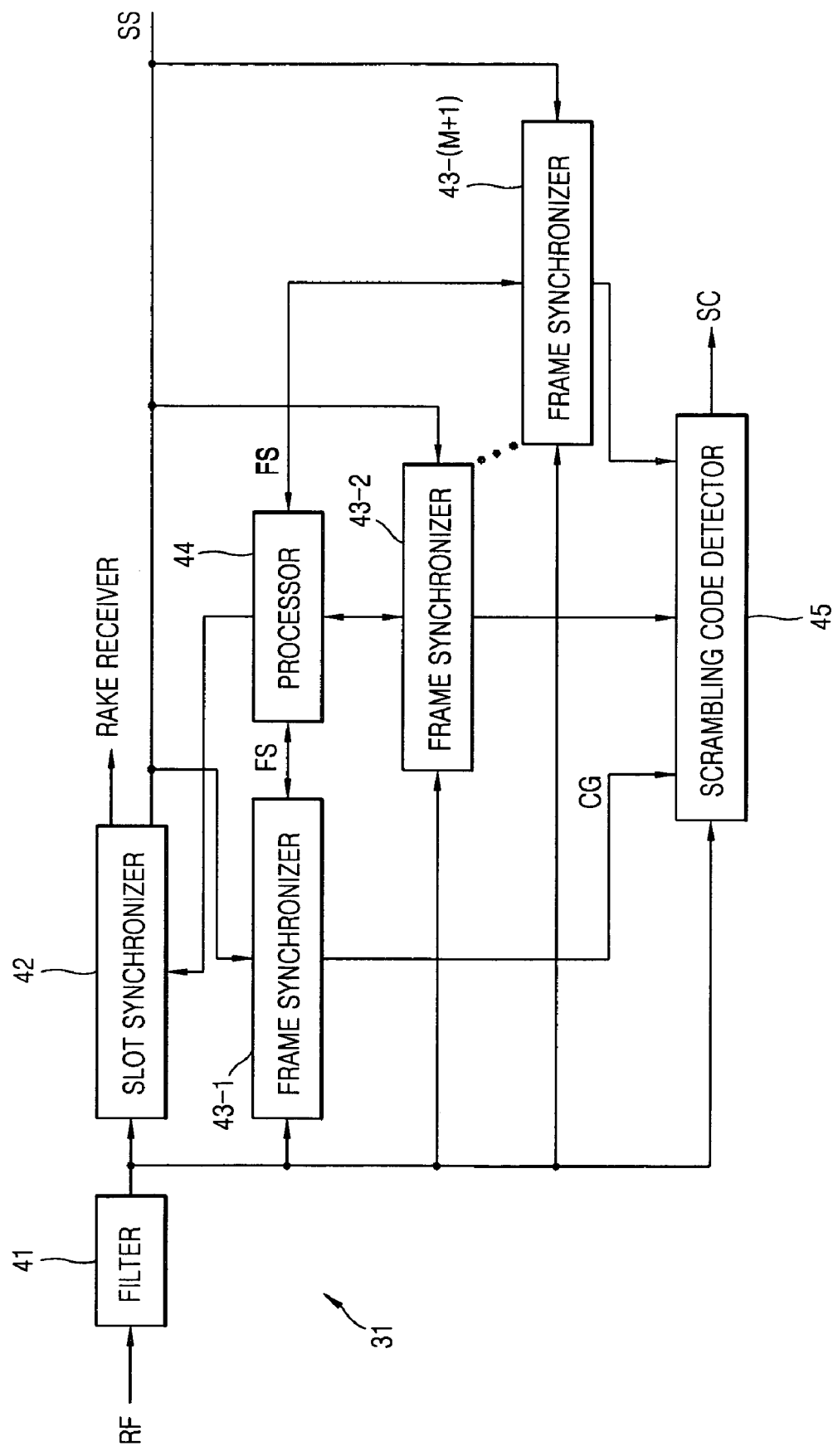
FIG. 5 illustrates the construction of a cell searching apparatus of a mobile terminal in an asynchronous mobile communication system in accordance with a second embodiment of the present invention.

FIG. 5 illustrates the construction of a cell searching apparatus of a mobile terminal in an asynchronous mobile communication system in accordance with a second embodiment of the present invention.

The cell searching apparatus of a mobile terminal in accordance with a second embodiment of the present invention includes: a filter 41 for removing a noise component in an RF signal; a slot synchronizer 42 for serially performing a slot synchronization using PSCs repeatedly detected after a slot period among a plurality of PSCs outputted from the filter 41; a processor 44 for controlling slot synchronization, frame synchronization, and an SCG detecting operation; a plurality of frame synchronizers (43-1)~(43-(M+1)) connected in parallel to the slot synchronizer 42, for performing SCG detection using each slot synchronization information serially outputted from the slot synchronizer 42 and each SSC outputted from the filter 41, and for determining a desired SCG under the control of the processor 44 based on the detected SCG; and a scrambling code detector 45 for detecting an SC using the determined SCG.

The plurality of frame synchronizers (43-1)~(43-(M+1)) perform SCG detection in parallel using each slot synchronization information and each SSC. If the detected SCG is not an SCG (that is, a finally desired SCG) of a base station to which the mobile terminal 31 belongs, the plurality of frame synchronizers (43-1)~(43-(M+1)) detect again only adjacent SCGs of the detected SCG in order to detect a finally desired SCG.

Operation of the cell searching apparatus of a mobile terminal constructed as described above will now be explained. An initial cell searching of the mobile terminal 31 refers to searching a cell (e.g., a base station), from which the mobile terminal 31 can receive service when the mobile terminal 31 is powered on, and cell re-selection refers to selection of a suitable cell if a reception strength from the current cell is below a specific level. The present invention can be applied to both cases of initial cell searching and cell re-selection.

When the mobile terminal 31 is powered on, it receives PSCs and SSCs transmitted from the arbitrary number of base stations for each slot. At this time, since the PSCs and the SSCs are transmitted from the base station to which the mobile terminal 31 belongs and from base stations around it, PSCs and SSCs with several different receptions strengths are received by the mobile terminal. In this case, a PSC with the most powerful reception strength is considered to be a PSC which has been transmitted from the base station where the mobile terminal belongs.

The slot synchronizer 42 of the mobile terminal 31 not only detects the PSC with the most powerful reception strength but also performs slot synchronization using the PSC repeatedly detected after the slot period regardless of the reception strength.

The slot synchronizer 42 successively performs slot synchronization even on M number of major PSCs and informs the process 44 of the slot synchronization information performed using the PSC with the most powerful reception strength. The number (M+1) of slot synchronization information is identical to the number of frame synchronizers and can be set by a developer.

The processor 44 stores the first slot synchronization information and transmits the first slot synchronization information to the frame synchronizer 43-1. The processor 44 stores other slot synchronization information serially outputted from the slot synchronizer 42 and transmits that information to each frame synchronizers (43-2)~(43-(M+1)).

The frame synchronizer 43-1 searches SSCs outputted from the filter 41 based on the first slot synchronization information.

The frame synchronizer 43-2 receives the second slot synchronization information and searches SSCs outputted from the filter 41 based on the second slot synchronization information. Other frame synchronizers are operated in the same manner, so that M+1 number of frame synchronizers (43-2)~(43-(M+1)) are operated in parallel.

When one of the M+1 number of frame synchronizers (43-2)~(43-(M+1)) completes the frame synchronization and SCG detection, the M number of other frame synchronizers stop their operation.

For example, the frame synchronizer 43-1 detects an SSC with the most powerful reception strength, performs a frame synchronization based on the SSC and detects an SCG, the processor 44 stops operation of the other frame synchronizers (43-2)~(43-(M+1)).

Then, processor 44 checks whether the detected SCG is a dominant SCG (that is, whether the SCG is an SCG of the specific base station where the mobile terminal 31 belongs). Since the processor 44 has received the slot synchronization information performed using the PSC with the most powerful reception strength from the slot synchronizer 42, it can check whether the detected SCG is the SCG of the specific base station where the mobile terminal 31 belongs.

The detected SCG is not the SCG using the slot synchronization information based on the PSC with the most powerful reception strength. Then, the processor 44 judges that the detected SCG is not an SCG of the specific base station where the mobile terminal 31 belongs but an SCG of an adjacent base station of the specific base station.

In the case that the thusly detected SCG is an SCG of the adjacent base station, since the adjacent base station uses the adjacent SCG of the SCG of the specific base station, the mobile terminal 31 does not perform the SSC searching on every case (in the case of 960) like in the conventional art but performs a searching only on the adjacent SSCs of the SSC used in detecting the SCG. For example, if the frame synchronizer 43-2 detects the SCG which is dominant, the processor controls the frame synchronizer 43-1 and the frame synchronizer 43-3 that are adjacent to the frame synchronizer 43-2. The frame synchronizer 43-1 and the frame synchronizer 43-3 respectively search adjacent SSCs of the SSC used in detecting the SCG.

The processor 44 detects an SSC with the more powerful reception strength among the searched adjacent SSCs, and frame synchronization and SCG detection are performed by using the detected SSC. The detected SCG is outputted to the scrambling code detector 45.

The detected SCG is an SCG using the slot synchronization information based on the PSC with the most powerful reception strength, the detected SCG is outputted to the scrambling code detector 45.

Then, the scrambling code detector 45 detects an SC using the SCG, the slot synchronization and frame synchronization of the SCG, so that the mobile terminal 31 completes the cell searching.

As described above, in the present invention, an adjacent SCG is allocated to an adjacent base station, a frame synchronization is performed in parallel, and if the first detected SCG is an SCG transmitted from a specific base station where the mobile terminal 31 belongs, an SC is detected by using the SCG. Meanwhile, if the first detected SCG is an SCG transmitted from an adjacent base station of the specific base station, every case of SCGs is not detected but only the adjacent SCG of the corresponding SCG is detected to thereby determine a suitable SCG, and an SC is detected by using the determined SCG.

Figure 6:
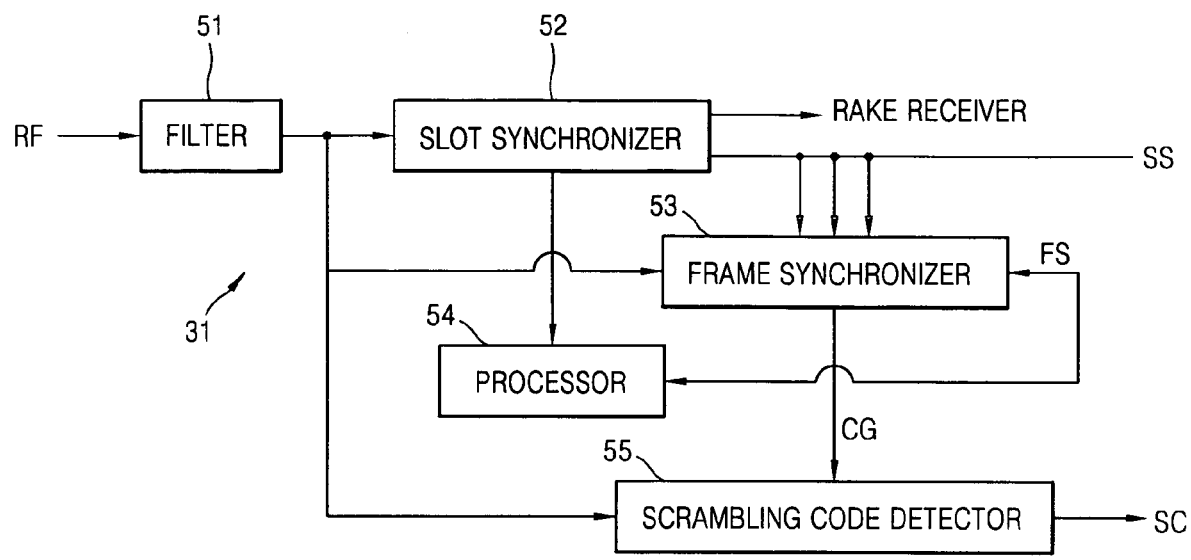
FIG. 6 illustrates the construction of a cell searching apparatus of a mobile terminal in an asynchronous mobile communication system in accordance with a third embodiment of the present invention.

FIG. 6 illustrates the construction of a cell searching apparatus of a mobile terminal in an asynchronous mobile communication system in accordance with a third embodiment of the present invention.

A cell searching apparatus of a mobile terminal in accordance with a third embodiment of the present invention includes: a filter 51 for removing a noise component contained in an RF signal; a slot synchronizer 52 for serially performing a slot synchronization using PSCs that are repeatedly detected after a slot period among a plurality of PSCs outputted from the filter 51; a processor 54 for controlling slot synchronization, frame synchronization and an SCG detection operation; a frame synchronizer 53 for serially performing a frame synchronization and an SCG detection operation using each SSC outputted from the filter 51 for each slot synchronization information outputted from the slot synchronizer 52 and for determining a desired SCG based on the detected SCG under control of the processor 54; and a scrambling code detector 55 for detecting an SC by using the determined SCG.

The cell searching apparatus of a mobile terminal in accordance with the third embodiment of the present invention is performed in the same manner as the operation of the cell searching apparatus which includes the plurality of frame synchronizers (43-1)~(43-(M+1)) and performs the frame synchronization in parallel, except that it has one frame synchronizer 53 and the frame synchronization and SCG detection are serially performed by each slot synchronization information by the frame synchronizer 53.

As so far described, the cell searching apparatus and method in an asynchronous mobile communication system have the following advantages. First, slot synchronization is detected using the most powerful reception strength, the slot synchronization serially detected by the PSCs are repeatedly detected after a slot period, and the frame synchronization detection is performed based on the first detected slot synchronization. As a result of these steps, detection speed of the frame synchronization is significantly increased.

In addition, one cell is set as a reference cell and an adjacent SCG is allocated to its adjacent cells. Thus, if an SCG detected after slot synchronization is not a suitable SCG, only the adjacent SCGs of the detected SCG are detected to determine a suitable SCG. Therefore, SCG detection speed is increased and a load for a cell searching is reduced.

Moreover, since the frame synchronization and SCG detection are quickly performed, a cell searching speed of a mobile terminal becomes fast.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An asynchronous mobile communication system for searching a base station, comprising:
    a plurality of base stations allocated in advance among at least two geographically adjacent scrambling code groups (SCGs); and
    a mobile terminal which detects a first SCG based on first detected slot synchronization information and determines whether the first SCG corresponds to a second predetermined SCG, and if the first SCG does not correspond to said second predetermined SCG, the mobile terminal determines the first SCG to be geographically adjacent said second predetermined SCG.

2. The system of claim 1, wherein the mobile terminal includes a cell searching apparatus for:
    serially detecting a plurality of slot synchronization information,
    performing SCG detection using each slot synchronization information,
    detecting one or more SCGs adjacent to the first SCG,
    determining a suitable SCG among the detected adjacent SCGs, and
    searching a base station to which the mobile terminal belongs using the determined SCG and a slot synchronization and a frame synchronization of the SCG, the determined SCG corresponding to said second predetermined SCG.

3. The system of claim 1, wherein the cell searching apparatus comprises:
    a filter which removes a noise component in a reception radio frequency (RF) signal;
    a slot synchronizer which serially performs a slot synchronization using primary synchronization codes (PSCs) that are repeatedly detected after a slot period among a plurality of PSCs outputted from the filter;
    a processor which controls operations of slot synchronization, frame synchronization, and SCG detection;
    a plurality of frame synchronizers connected in parallel to the slot synchronizer, each frame synchronization performing SCG detection using corresponding slot synchronization information serially outputted from the slot synchronizer and each SSC outputted from the filter and determining a desired SCG based on the detected SCG under the control of the processor; and
    a scrambling code detector for detecting an SC based on said second predetermined SCG, a slot synchronization and a frame synchronization of the SCG.

4. The system of claim 3, wherein the plurality of frame synchronizers perform an SCG detection in parallel using the corresponding slot synchronization information and each SSC, wherein if the first detected SCG is not an SCG of a specific base station to which the mobile belongs, pertinent frame synchronizers among the plurality of frame synchronizers detect again adjacent SCGs of the detected SCG in order to detect an SCG of the specific base station.

5. The system of claim 1, further comprising a cell searching apparatus which comprises:
    a filter which removes a noise component contained in a reception RF signal;
    a slot synchronizer which serially performs slot synchronization using PSCs that are repeatedly detected after a slot period among a plurality of PSCs outputted from the filter;
    a processor which controls a slot synchronization, a frame synchronization and an SCG detection operation;
    a frame synchronizer which serially performs a frame synchronization and an SCG detection operation using each SSC outputted from the filter on each slot synchronization information received from the slot synchronizer, and determining a desired SCG based on the detected SCG under control of the processor; and
    a scrambling code detector which detects an SC using the determined SCG and a slot synchronization and a frame synchronization of the SCG, the determined SCG corresponding to said second predetermined SCG.

6. The system of claim 1, wherein the second predetermined SCG includes a base station to which the mobile terminal belongs.

7. A cell searching apparatus in an asynchronous mobile communication system, comprising:
    a filter which removes a noise component in an RF signal transmitted from base stations;
    a slot synchronizer which serially performs slot synchronization using PSCs repeatedly detected after a slot period among a plurality of PSCs outputted from the filter;
    a processor which controls a slot synchronization, frame synchronization, and SCG detecting operation;
    a plurality of frame synchronizers which detect SCGs using each SSC outputted from the filter, and determines a desired SCG under control of the processor based on the first detected SCG; and
    a scrambling code detector which detects an SC using the determined SCG, wherein, if the first detected SCG is an SCG detected based on the specific slot synchronization information, the processor selects the first detected SCG as a desired SCG, and
    if the first detected SCG is not an SCG detected based on the specific slot synchronization information, the processor detects one or more SCGs adjacent to the first detected SCG and selects one of the adjacent SCGs as a desired SCG.

8. The apparatus of claim 7, wherein adjacent base stations use an adjacent SCGs.

9. The apparatus of claim 7, wherein the slot synchronizer informs the processor of detected specific slot synchronization information using a PSC with a most powerful reception strength.

10. A cell searching apparatus in an asynchronous mobile communication system, comprising:
   a filter which removes a noise component in an RF signal transmitted from base stations;
   a slot synchronizer which serially performs a slot synchronization using PSCs repeatedly detected after a slot period among a plurality of PSCs outputted from the filter;
   a processor which controls a slot synchronization, frame synchronization and SCG detecting operation;
   a frame synchronizer which serially performs frame synchronization and SCG detecting operation using each SSC outputted from the filter on each slot synchronization information, and determining a desired SCG under the control of the processor based on the first detected SCG; and
   a scrambling code detector which detects an SC using the determined SCG, wherein if the first detected SCG is an SCG detected based on the specific slot synchronization information, the processor selects the first detected SCG as a desired SCG, and
      if the first detected SCG is not an SCG detected based on the specific slot synchronization information, the processor detects SCGs adjacent to the first detected SCG and selects the adjacent SCGs as a desired SCG.

11. The apparatus of claim 10, wherein adjacent base stations use an adjacent SCGs.

12. The apparatus of claim 10, wherein the slot synchronizer informs the processor of detected specific slot synchronization information using a PSC with a most powerful reception strength.

13. An SCG allocating method in an asynchronous mobile communication system, comprising: setting first one of a plurality of base stations as a reference base station and allocating a reference SCG thereto; allocating an adjacent SCG of the reference SCG to at least a second one of the base stations adjacent to the first base station but not allocated to the reference SCG; and determining whether a third one of the base stations is in a cell adjacent to the cell of the second base station base station but is not allocated to either of the reference SGG or the adjacent SGG; and allocating an SGG different from the reference SGG and adjacent SGG to the third base station if the third base station is in a cell adjacent to the cell of the second base station but is not allocated to either of the reference SGG or the adjacent SGG.

14. A cell searching method in an asynchronous mobile communication system, comprising:
   serially performing slot synchronization using PSCs received from a plurality of base stations;
   performing multiple frame synchronization and SCG detection using SSCs received from the base stations based on each serially performed slot synchronization;
   checking whether a first detected SCG is a desired one;
   determining a suitable SCG among adjacent SCGs of the first detected SCG if the first detected SCG is not a desired one; and
   completing a base station searching using the determined SCG,
   wherein in determining a suitable SCG, if the first detected SCG is an SCG detected based on the slot synchronization information detected using the PSC with the most powerful reception strength among PSCs that are repeatedly detected after the slot period, the first detected SCG is determined as a suitable SCG.

15. The method of claim 14, wherein adjacent base stations use adjacent SCGs.

16. The method of claim 14, wherein, in the step of performing a slot synchronization, slot synchronization is performed using a PSC that is repeatedly detected after a slot period, and a slot synchronization is serially performed by using different PSCs that are repeatedly detected.

17. The method of claim 14, wherein, in the step of checking, it is checked whether the first detected SCG is an SCG detected based on the slot synchronization information detected by using the PSC with the most powerful reception strength among PSCs that are repeatedly detected after the slot period.

18. The method of claim 14 further comprising:
   determining the first detected SCG as a suitable SCG if the first detected SCG is a desired SCG.

19. A cell searching method in an asynchronous mobile communication system, comprising:
   serially performing slot synchronization using PSCs received from a plurality of base stations;
   performing multiple frame synchronization and SCG detection using SSCs received from the base stations based on each serially performed slot synchronization;
   checking whether a first detected SCG is a desired one;
   determining a suitable SCG among adjacent SCGs of the first detected SCG if the first detected SCG is not a desired one; and
   completing a base station searching using the determined SCG,
   wherein determining a suitable SCG among adjacent SCGs comprises:
   searching adjacent SSCs of an SSC used when the first detected SCG is detected based on the slot synchronization information detected using the PSC with a most powerful reception strength; and
   detecting an SSC with a greatest value among the searched adjacent SSCs and performing a frame synchronization and SCG detection using the SSC.

20. A method for communicating information in a mobile communication system, comprising:
   selecting a first base station from a plurality of base stations;
   allocating a first scrambling code group to the selected base station;
   selecting a second base station from the plurality of base stations;
   determining whether the second base station is in a cell adjacent to a cell of the first base station and not included in the first scrambling code group; and
   allocating a second scrambling code group to the second base station if the second base station is in a cell adjacent to the first base station but not in the first scrambling code group.

21. The method of claim 20, wherein the first scrambling code group and the second scrambling code group are related based on a predetermined pattern.

22. The method of claim 21, wherein in the predetermined pattern, the first scrambling code group and the second scrambling code group are sequentially related.

23. The method of claim 21, wherein the first scrambling code group and the second scrambling code group are adjacent code groups.

24. The method of claim 20, further comprising:
selecting a third base station from the plurality of base stations;
determining whether the third base station is in a cell adjacent the cell of the second base station but not include in either of the first or second scrambling code groups; and
allocating a third scrambling code to the third base station if the third base station is in a cell adjacent the cell of the second base station but not in either of the first or second scrambling code groups.

25. The method of claim 24, wherein the second scrambling code and the third scrambling code are adjacent scrambling codes.

* * * * *